United States Patent
Lee

(10) Patent No.: US 12,250,441 B2
(45) Date of Patent: Mar. 11, 2025

(54) CAMERA MODULE

(71) Applicant: LG INNOTEK CO., LTD., Seoul (KR)

(72) Inventor: Yong Joo Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 120 days.

(21) Appl. No.: 18/014,237

(22) PCT Filed: Jun. 29, 2021

(86) PCT No.: PCT/KR2021/008138
§ 371 (c)(1),
(2) Date: Jan. 3, 2023

(87) PCT Pub. No.: WO2022/005151
PCT Pub. Date: Jan. 6, 2022

(65) Prior Publication Data
US 2023/0262305 A1    Aug. 17, 2023

(30) Foreign Application Priority Data
Jul. 2, 2020    (KR) .................. 10-2020-0081556

(51) Int. Cl.
*H04N 23/54* (2023.01)
(52) U.S. Cl.
CPC .................. *H04N 23/54* (2023.01)

(58) Field of Classification Search
CPC ...................................................... H04N 23/54
USPC .......................................................... 348/374
See application file for complete search history.

(56) References Cited

U.S. PATENT DOCUMENTS

| 2013/0027600 | A1* | 1/2013 | Pavithran | H04N 23/57 |
| | | | | 348/335 |
| 2020/0409166 | A1 | 12/2020 | Park | |
| 2021/0318592 | A1 | 10/2021 | Kim et al. | |

FOREIGN PATENT DOCUMENTS

| JP | 2016-66090 A | 4/2016 |
| KR | 10-2017-0043889 A | 4/2017 |
| KR | 10-2019-0038146 A | 4/2019 |
| KR | 10-2019-0137730 A | 12/2019 |
| WO | WO2020/050650 A1 | 3/2020 |

* cited by examiner

*Primary Examiner* — Joel W Fosselman
(74) *Attorney, Agent, or Firm* — Birch, Stewart, Kolasch & Birch, LLP

(57) ABSTRACT

Disclosed in an embodiment of the present invention is a camera module including a first bracket, a lens module accommodated in the first bracket, a second bracket disposed outside the first bracket, and a shaft disposed between the first bracket and the second bracket, wherein the second bracket includes a shaft seating groove in which the shaft is seated and which is open in an optical axis direction.

19 Claims, 13 Drawing Sheets

[FIG. 1]
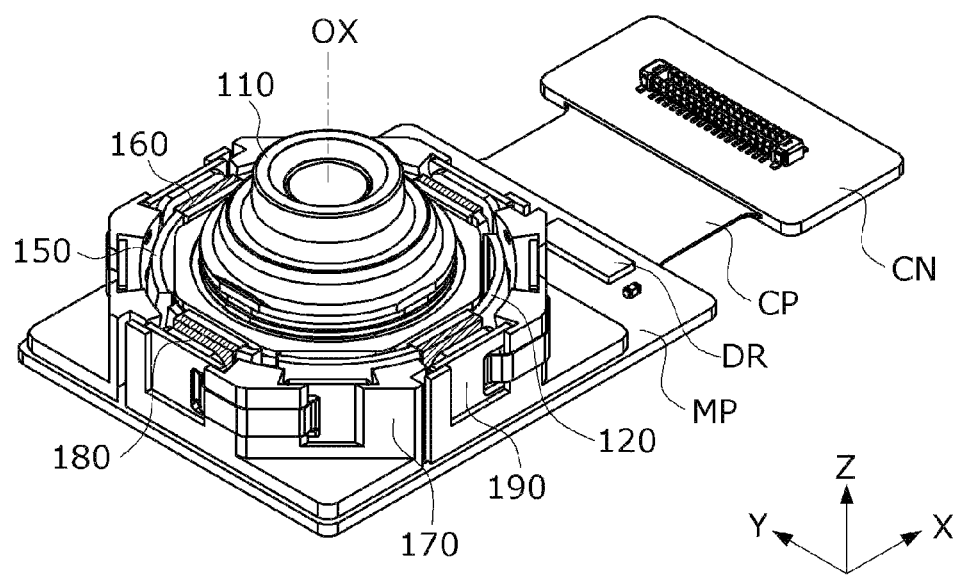

[FIG. 2]
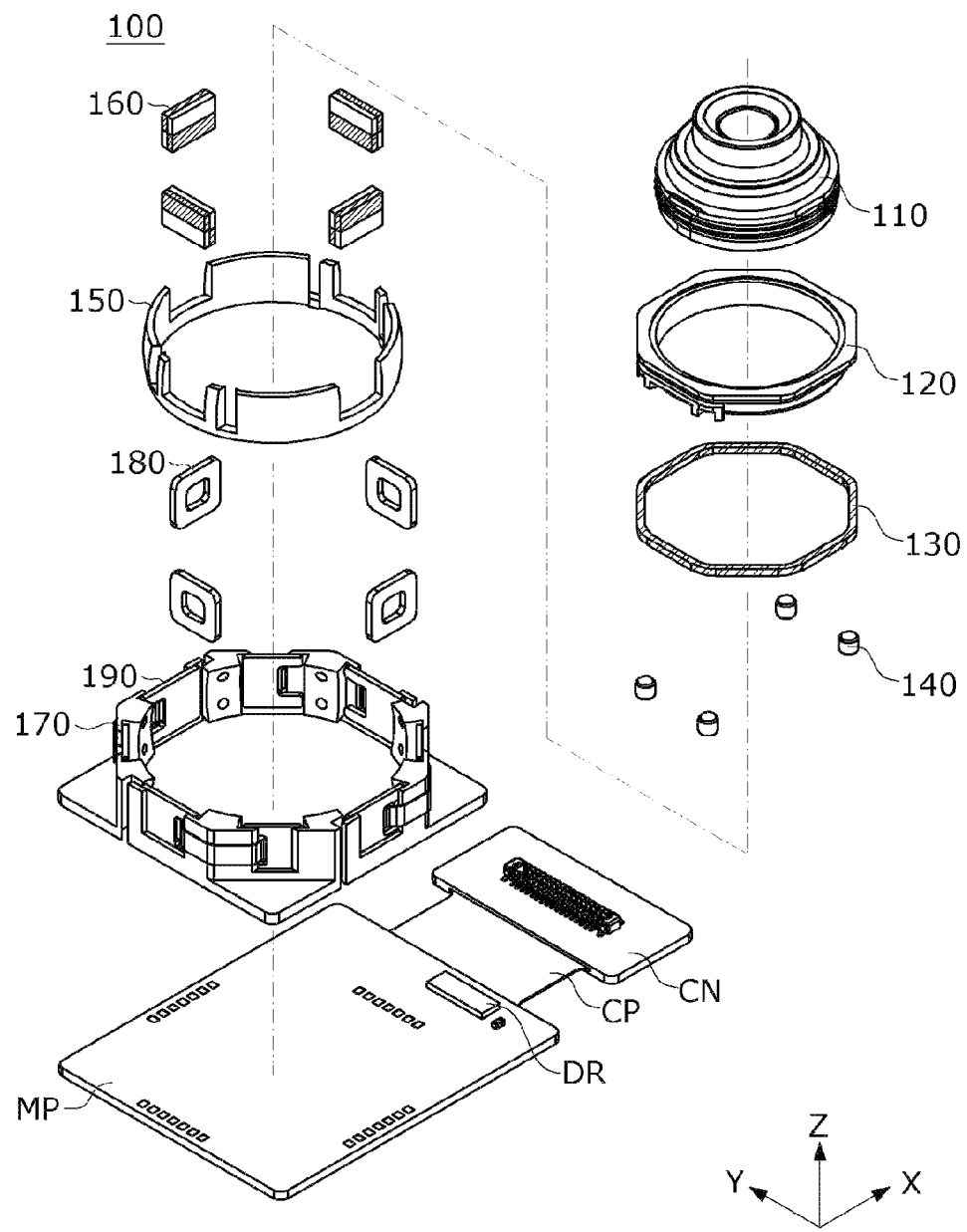

[FIG. 3]
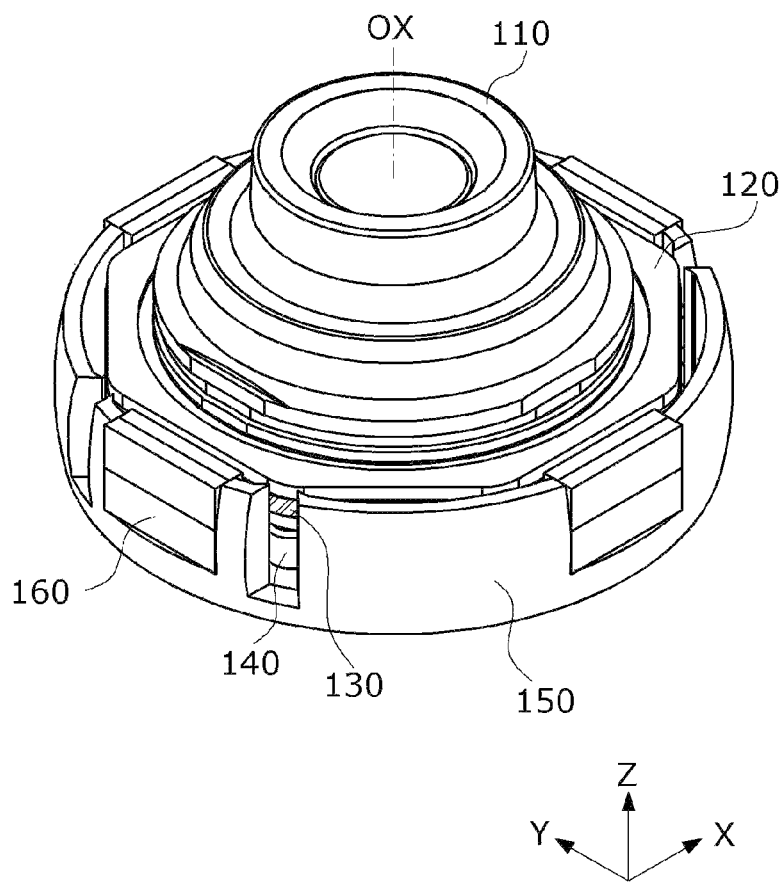

[FIG. 4]
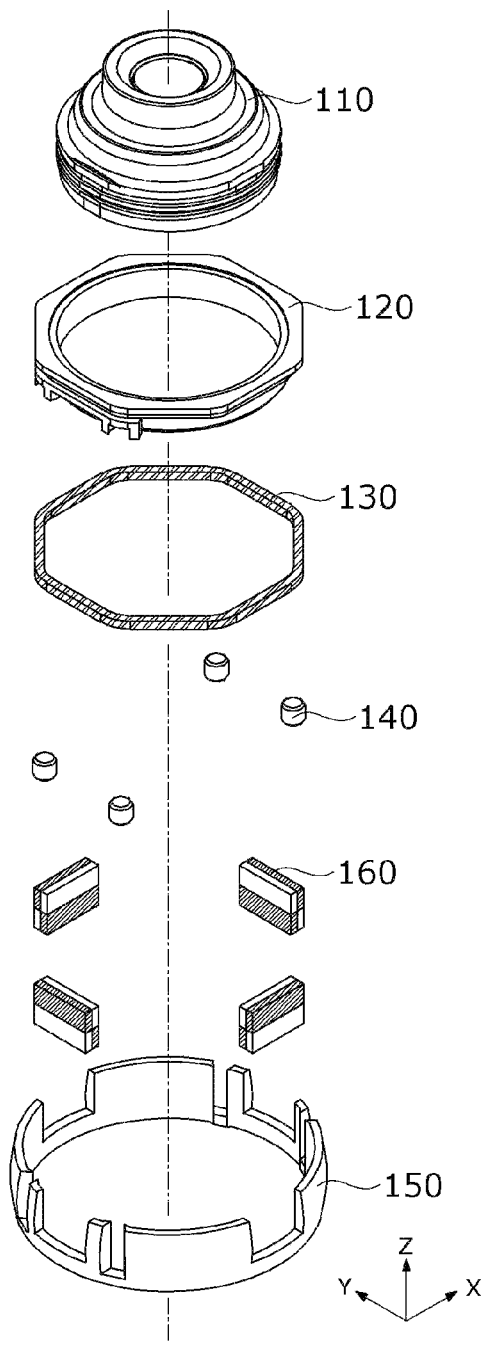

[FIG. 5]
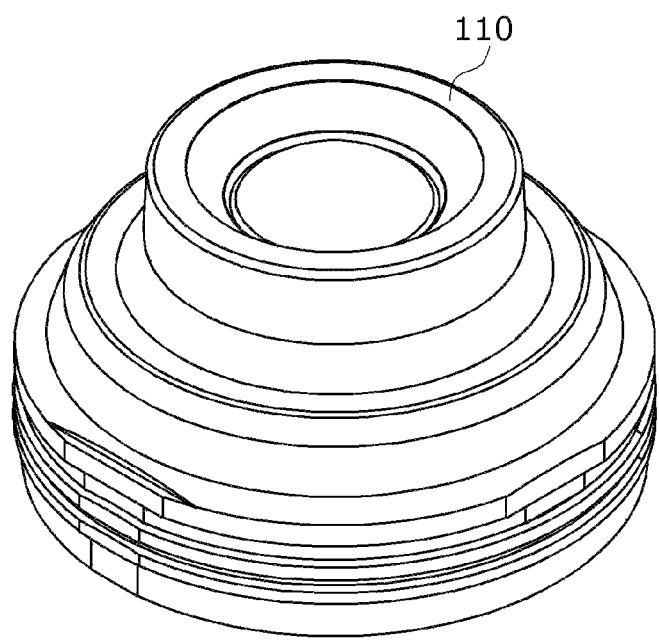
[FIG. 6]
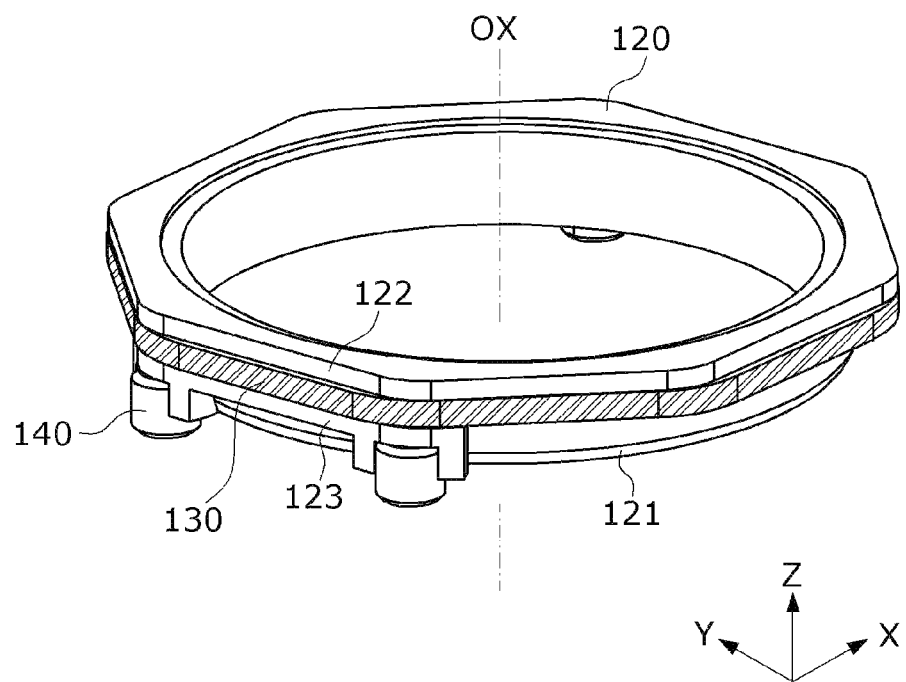

[FIG. 7]
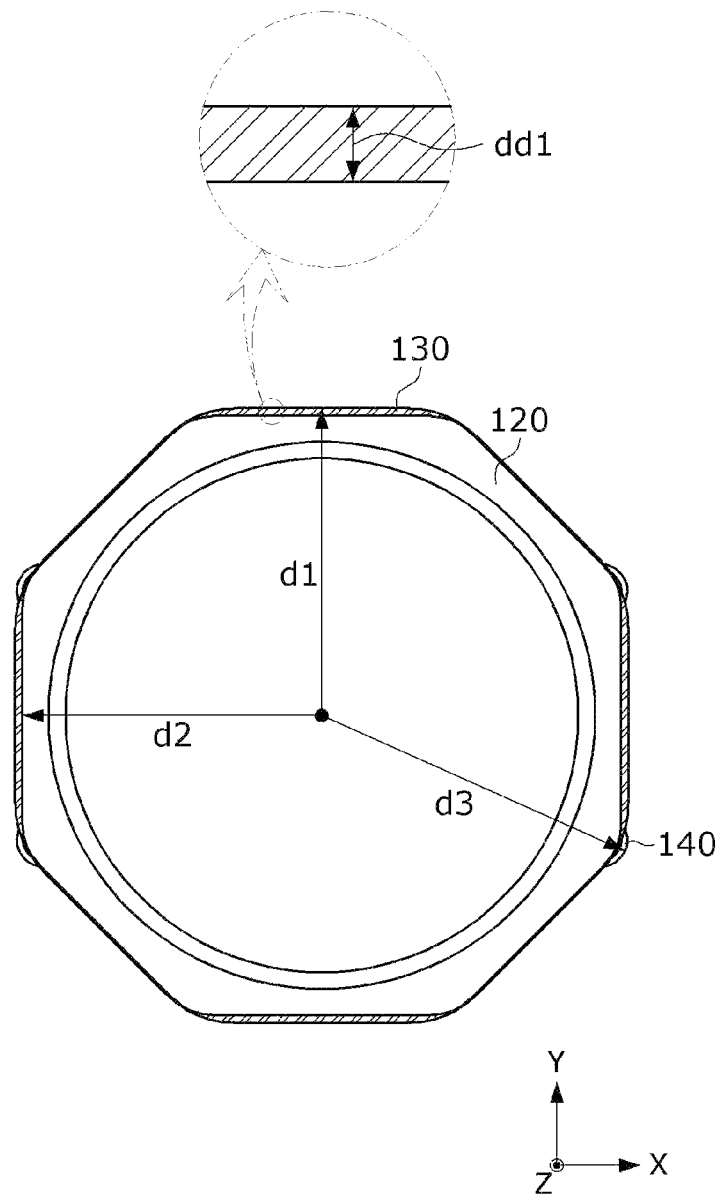

[FIG. 8]
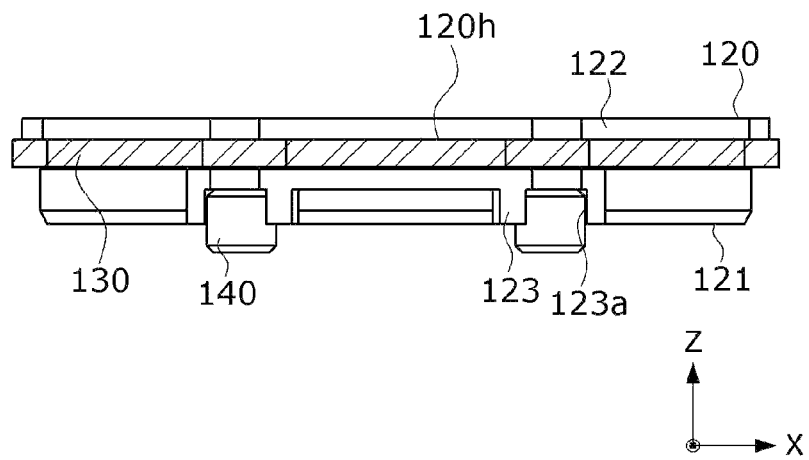
[FIG. 9]
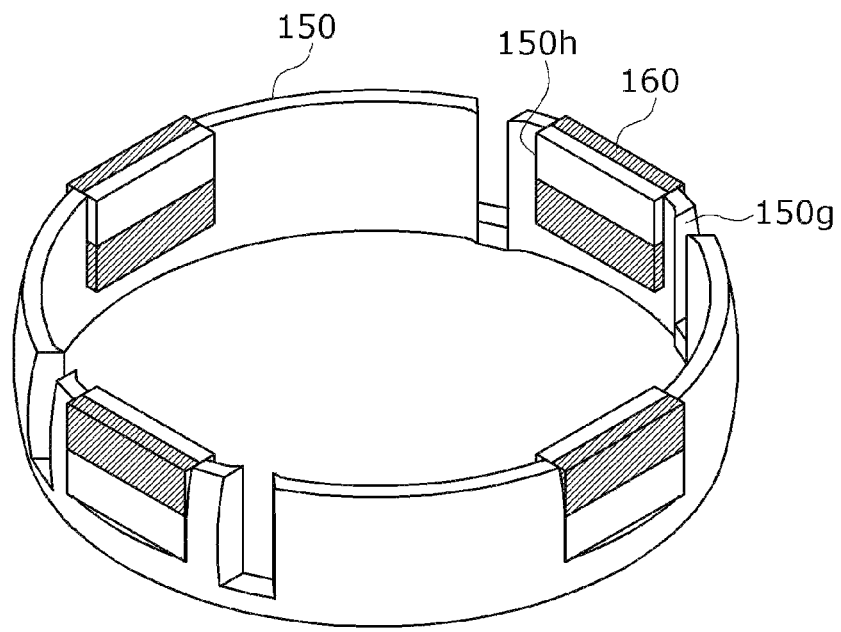

[FIG. 10]
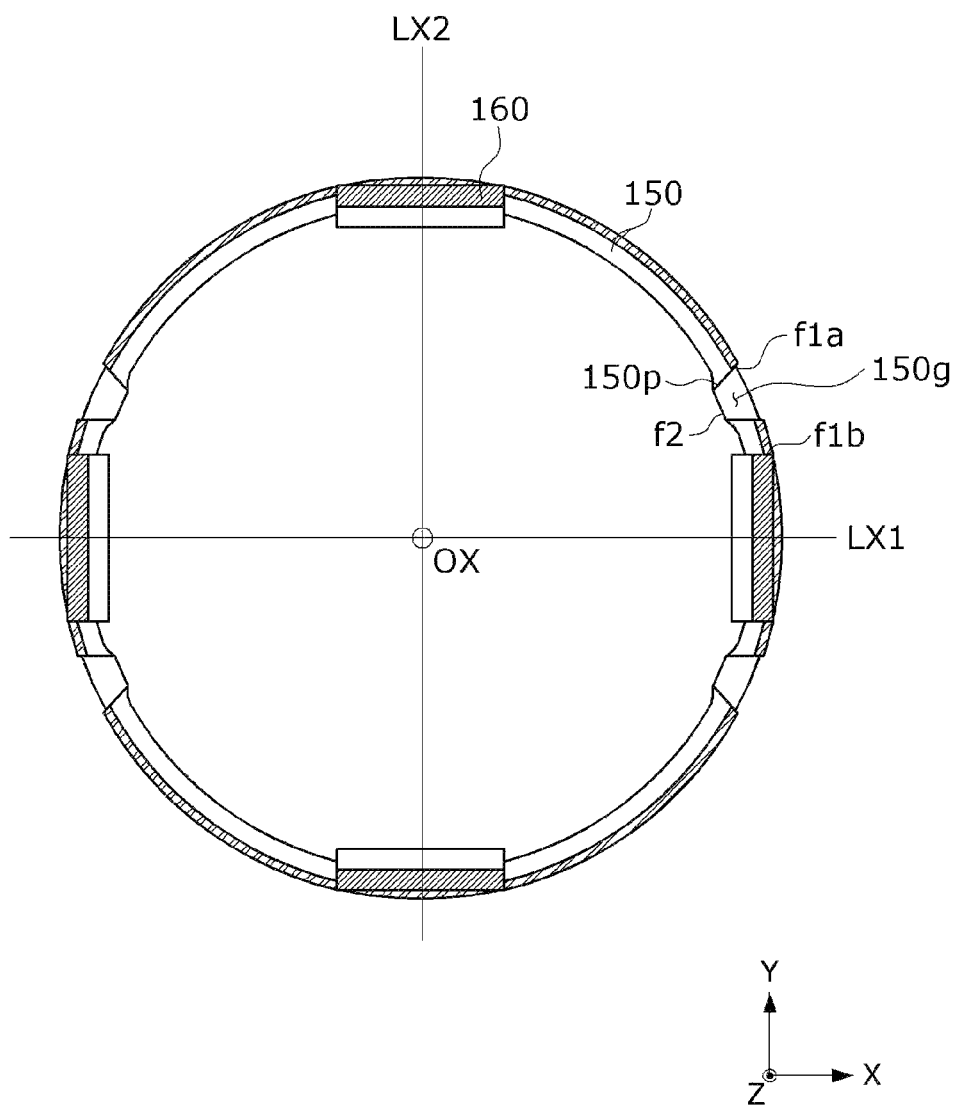

[FIG. 11]
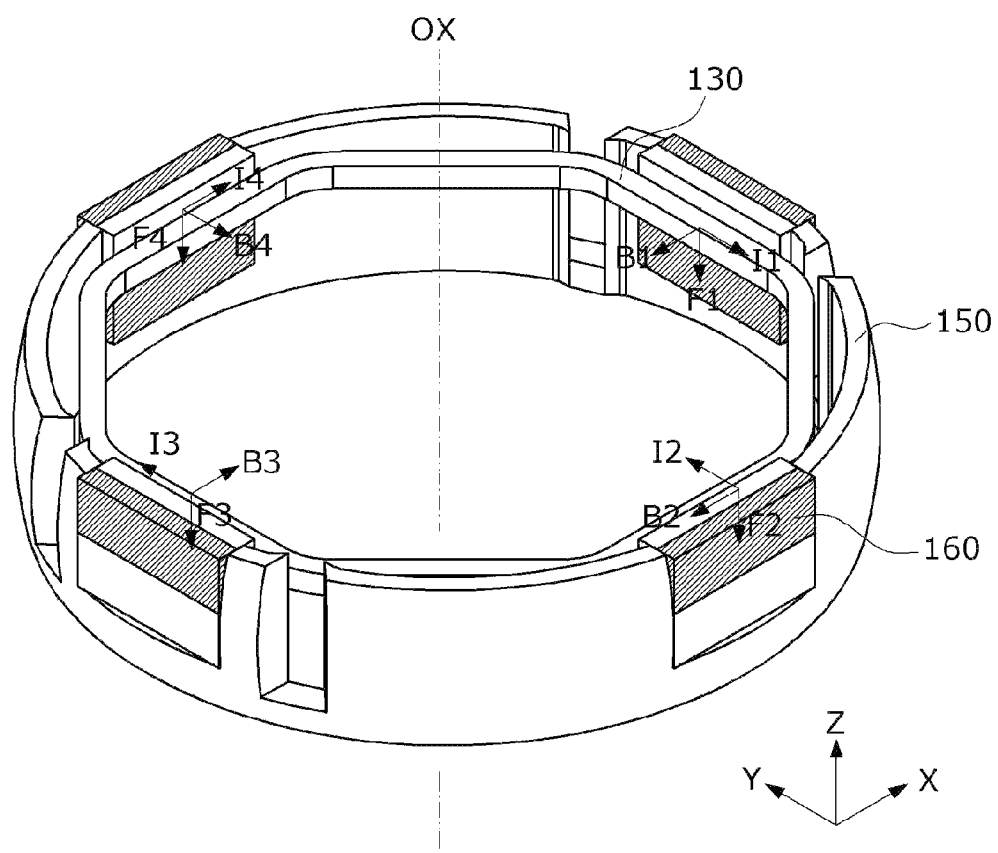

[FIG. 12]
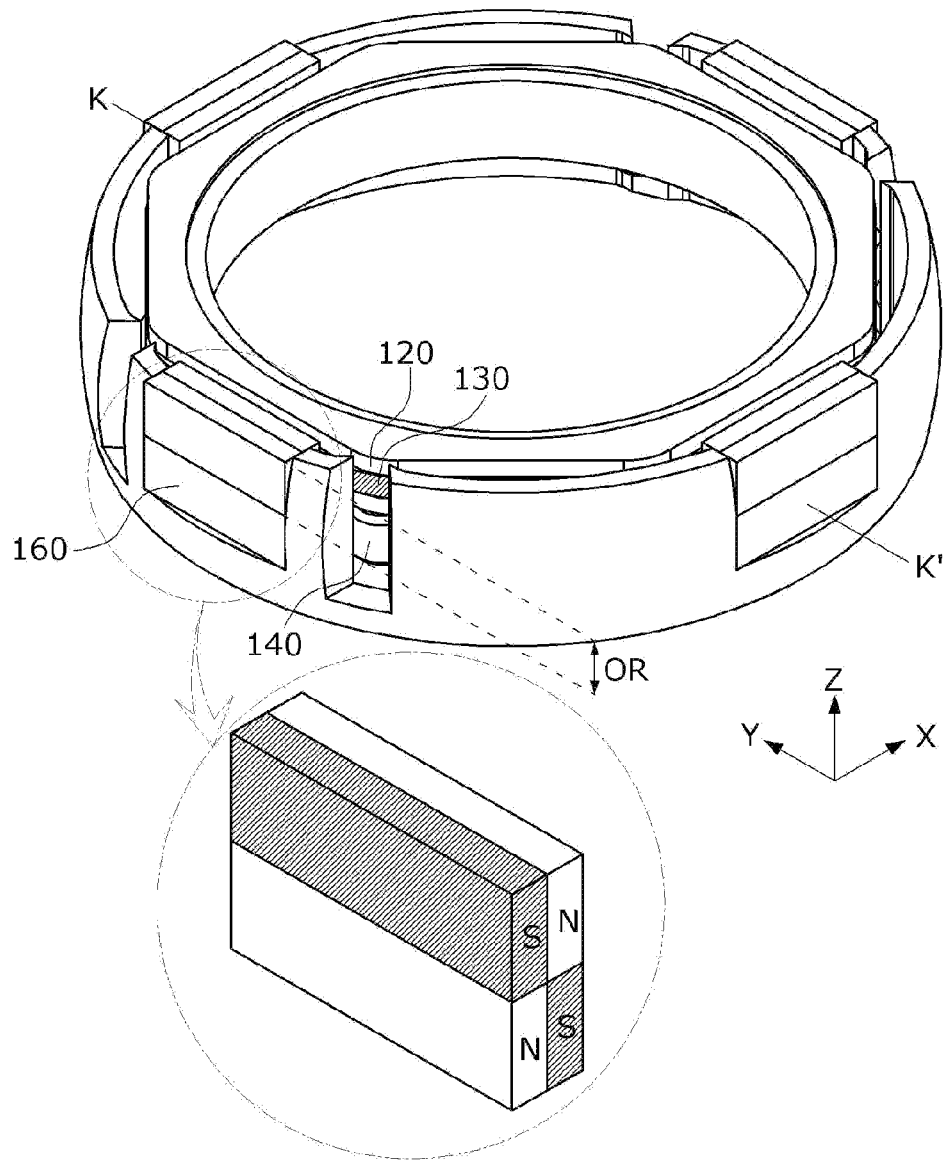

[FIG. 13]
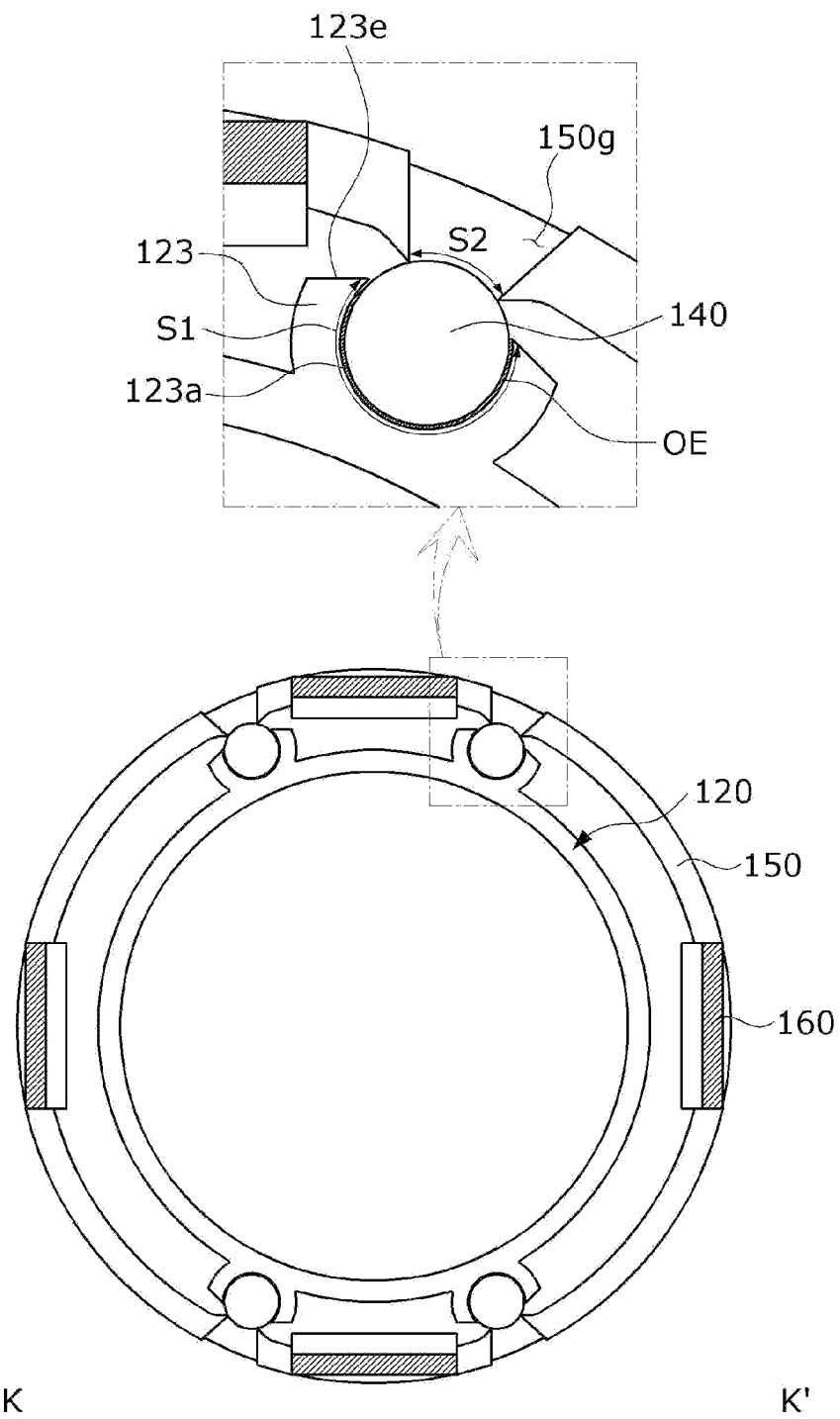

[FIG. 14]
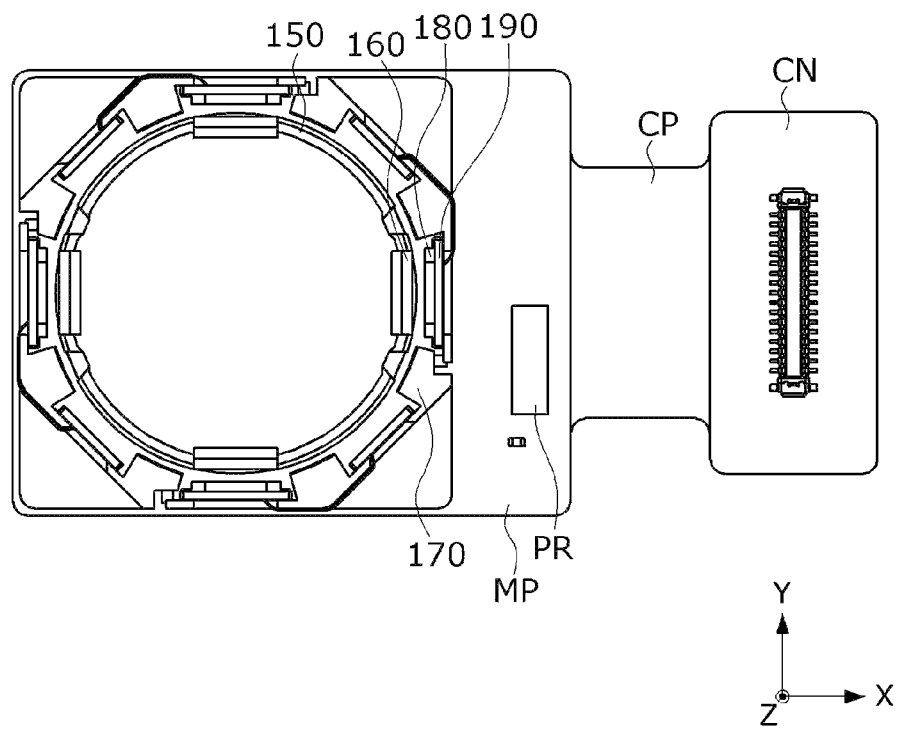

[FIG. 15]
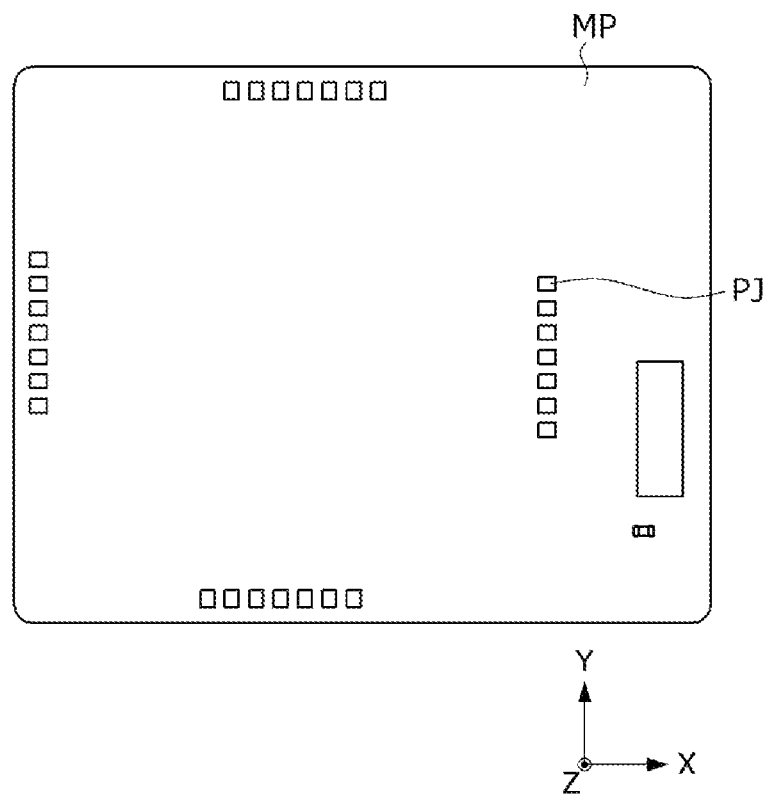
[FIG. 16]
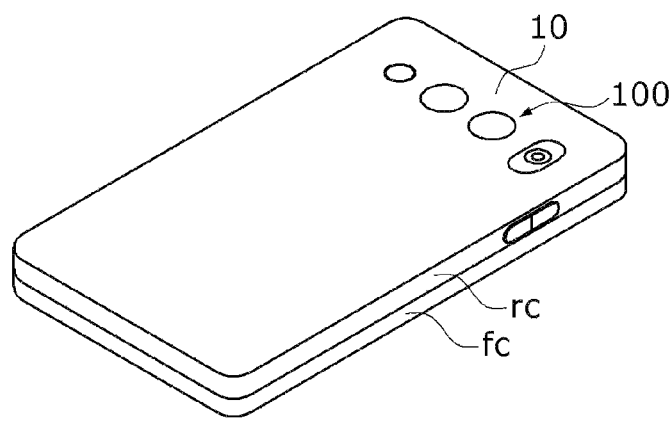

CAMERA MODULE

CROSS REFERENCE TO RELATED APPLICATIONS

This application is the National Phase of PCT/KR2021/008138 filed on Jun. 29, 2021, which claims priority under 35 U.S.C. § 119(a) to Patent Application No. 10-2020-0081556, filed in the Republic of Korea on Jul. 2, 2020, all of which are hereby expressly incorporated by reference into the present application.

TECHNICAL FIELD

An embodiment relates to a camera module.

Background Art

Cameras are apparatuses which capture images or moving images of subjects and are installed in portable devices, drones, vehicles, and the like. In order to improve the quality of an image, a camera device or camera module may have an image stabilization (IS) function that corrects or prevents image shake caused by the movement of a user, an auto focusing (AF) function that automatically adjusts a distance between an image sensor and a lens so as to arrange a focal length of the lens, and a zooming function that increases or decreases a magnification using a zoom lens to capture an image of a subject at a long distance.

Meanwhile, when the number of pixels of the image sensor increases, the resolution increases, and a size of a pixel decreases. As the size decreases, an amount of light received by the pixel for the same time decreases. Accordingly, as the number of pixels of a camera increases, an image shake phenomenon caused by hand shake occurring due to a decrease in shutter speed in a dark environment may more severely occur. An optical image stabilization (OIS) technique for correcting movement by changing an optical path is a typical image stabilization technique.

According to the general OIS technology, the movement of a camera can be detected by a gyrosensor or the like, and then a lens or a camera device including a lens and an image sensor can be tilted or moved based on the detected movement. When the lens or the camera device including the lens and the image sensor is tilted or moved for OIS, a space for tilting or moving needs to be additionally secured around the lens or the camera device.

Meanwhile, an actuator for the OIS may be disposed around the lens. In this case, the actuator for the OIS may include actuators for tilting along two axes, that is, an actuator for X-axis tilting and an actuator for Y-axis tilting, perpendicular to an optical axis Z.

However, due to recent needs for ultra-slim and ultra-small camera devices, there have been many spatial restrictions on the arrangement of the actuator for OIS, and it may be difficult to secure a sufficient space for a lens or a camera device including a lens and an image sensor to tilt or move for the OIS. In addition, as the number of pixels of a camera increases, it is preferable for a size of the lens to increase in order to increase an amount of received light, but there may be a limit on increasing the size of the lens due to a space occupied by the actuator for the OIS.

In addition, there is a problem that AF is not accurately performed due to the OIS.

Technical Problem

The present invention is directed to providing a camera device which accurately performs auto focusing (AF) even when moved by optical image stabilization (OIS).

The present invention is directed to providing a camera module having a structure regardless of linearity of movement when AF is performed.

Objectives to be achieved through the present invention are not limited thereto and may include objectives or effects which can be recognized through the technical solution or modes of the invention described below.

Technical Solution

One aspect of the present invention provides a camera module including a lens module accommodated in a first bracket, a second bracket disposed outside the first bracket, and a shaft disposed between the first bracket and the second bracket, wherein the second bracket includes a shaft seating groove in which the shaft is seated and which is open in an optical axis direction.

A maximum length from an optical axis to the first coil part may be greater than a maximum length from the optical axis to the first bracket.

The second bracket may include a bracket protrusion which is adjacent to the shaft seating groove and protrudes inward, and a side surface of the shaft seating groove may be inclined in an outward direction and has a width which increases in the outward direction.

The camera module may further include a magnet part and a first coil part surrounding the magnet part.

The first bracket may include a bracket base, a first protruding part protruding outward from an outer surface of the bracket base, and a second protruding part protruding outward from the outer surface of the bracket base, wherein the first protruding part may be disposed above the second protruding part.

The first coil part may be disposed between the first protruding part and the second protruding part.

The first coil part may have a closed loop and may be disposed between the first bracket and the second bracket.

The first coil part may move within a height of any one pole in an inner region of the magnet part in the optical axis direction.

The magnet part may include a plurality of magnets, and the plurality of magnets may be disposed in parallel in a first direction or second direction perpendicular to the optical axis direction.

The second bracket may further include a magnet seating portion on which the magnet part is seated.

Advantageous Effects

According to embodiments, a camera module which accurately performs auto focusing (AF) even when moved by optical image stabilization (OIS) can be provided.

In addition, according to embodiments, a camera module with improved reliability can be implemented.

According to embodiments, a camera module with an improved power efficiency can be provided.

Various useful advantages and effects of the present invention are not limited to the above-described content and may be more easily understood from the description of specific embodiments of the present invention.

DESCRIPTION OF DRAWINGS

FIG. 1 is a perspective view illustrating a camera module according to an embodiment.

FIG. 2 is an exploded perspective view illustrating the camera module according to the embodiment.

FIG. 3 is a perspective view illustrating a lens module, a first bracket, a first coil part, a shaft, a second bracket, and a magnet part which are coupled according to an embodiment.

FIG. 4 is an exploded perspective view of that of FIG. 3.

FIG. 5 is a perspective view illustrating the lens module according to the embodiment.

FIG. 6 is a perspective view illustrating the first bracket, the first coil part, and the shaft according to the embodiment.

FIG. 7 is a top view illustrating the first bracket, the first coil part, and the shaft according to the embodiment.

FIG. 8 is a side view illustrating the first bracket, the first coil part, and the shaft according to the embodiment.

FIG. 9 is a perspective view illustrating the second bracket and the magnet part which are coupled according to the embodiment.

FIG. 10 is a top view illustrating the second bracket and the magnet part according to the embodiment.

FIG. 11 is a view for describing operation of the camera module according to the embodiment.

FIG. 12 is a side view of FIG. 11.

FIG. 13 is a cross-sectional view along line KK' in FIG. 12.

FIG. 14 is a top view illustrating the second bracket, the magnet part, a third bracket, a second coil part, a coil substrate, a main substrate, a connection part, and a connector part according to an embodiment.

FIG. 15 is a top view illustrating the main substrate according to the embodiment.

FIG. 16 is a view illustrating an optical device including the camera module according to the embodiment.

MODES OF THE INVENTION

Hereinafter, exemplary embodiments of the present invention will be described in detail with reference to the accompanying drawings.

However, the technical spirit of the present invention is not limited to some embodiments which will be described and may be embodied in a variety of different forms, and one or more components of the embodiments may be selectively combined, substituted, and used within the range of the technical spirit.

In addition, unless clearly and specifically defined otherwise by the context, all terms (including technical and scientific terms) used herein can be interpreted as having meanings generally understood by those skilled in the art, and the meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms, and in a case in which "at least one (or one or more) among A, B, and C" is described, this may include at least one among all possible combinations of A, B, and C.

In addition, in descriptions of components of the present invention, terms such as "first," "second," "A," "B," "(a)," and "(b)" may be used.

The terms are only to distinguish one element from another element, and the essence, order, and the like of the elements are not limited by the terms.

In addition, when an element is referred to as being "connected," "coupled," or "linked" to another element, such a description may include both a case in which the element is directly connected, coupled, or linked to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, an optical device according to the present embodiment will be described.

The optical device may include any one of a cellphone, a portable phone, a smart phone, a portable smart device, a digital camera, a laptop computer, a digital broadcasting terminal, a personal digital assistant (PDA), a portable multimedia player (PMP), and a navigation device. However, the types of the optical device are not limited thereto, and any device for capturing an image may be included in the optical device.

The optical device may include a main body. The main body may have a bar shape. Alternatively, the main body may have one of various structures, such as a slide type, a folder type, a swing type, and a swivel type, in which two or more sub-bodies are coupled to be relatively movable. The main body may include a case (a casing, a housing, or a cover) forming an exterior. For example, the main body may include a front case and a rear case. Various electronic components of the optical device may be installed in a space formed between the front case and the rear case. This will be described with reference to FIG. 16.

The optical device may include a display. The display may be disposed on one surface of the main body of the optical device. The display may output an image. The display may output an image captured by a camera. The optical device may include the camera.

FIG. 1 is a perspective view illustrating a camera module according to the embodiment, and FIG. 2 is an exploded perspective view illustrating the camera module according to the embodiment.

Referring to FIGS. 1 and 2, a camera module 100 according to the embodiment may include a lens module 110, a first bracket 120, a first coil part 130, shafts 140, a second bracket 150, magnet parts 160, a third bracket 170, second coil parts 180, coil substrates 190, a main substrate MP, a connection part CP, and a connector part CN. The components will be briefly described, and details thereof will be described below.

First, the lens module 110 may include at least one lens. Light passing through at least one lens may be provided to an image sensor which is disposed under the lens module 110 or disposed on the main substrate MP which will be described below. Although the image sensor is not illustrated in the drawings of the present specification, the image sensor may be disposed under the lens module or mounted on the main substrate MP to receive light.

In the present specification, the light passing through the lens module 110 may move along an optical axis OX. The optical axis OX may correspond to a center of the lens module 110.

The first bracket 120 may include a hole positioned in a central portion. In addition, the lens module 110 may be position in the hole. In other words, the first bracket 120 may be disposed to surround the lens module 110. According to the embodiment, the first bracket 120 may be disposed outside the lens module 110. An inner surface of the first bracket 120 may correspond to a shape of an outer surface of the lens module 110. For example, the lens module 110 may have a circular or polygonal shape. In addition, the first bracket 120 may have a circular or polygonal shape corresponding to the shape of the lens module 110.

In addition, the inner surface of the first bracket 120 may have a screw structure. In addition, the lens module 110 may have a groove structure corresponding to the screw structure formed in the inner surface of the first bracket 120. Accordingly, the first bracket 120 may be coupled to the lens module 110 disposed inward therefrom. However, the coupling method is not limited thereto.

In addition, the first bracket 120 may be coupled to the first coil part 130 and the shafts 140 which will be described below.

The first coil part 130 may be disposed outside the first bracket 120, and the first coil part 130 may be disposed between a first protruding part and a second protruding part which are disposed outside the first bracket 120. In addition, the first coil part 130 may be seated on the second protruding part. In addition, the shafts 140 may be disposed in shaft grooves formed in the second protruding part. This will be specifically described below.

The first coil part 130 may be disposed outside the first bracket 120. The first coil part 130 may have a closed loop shape. In addition, the first coil part 130 may be electrically connected to the main substrate MP disposed thereunder. The electrical connection may be performed by a wire or the like. In addition, through such a configuration, a current may flow through the first coil part 130 in a clockwise direction or a counter-clockwise direction opposite to the clockwise direction.

According to the embodiment, the first bracket 120 and the lens module 110 may move upward or downward according to a direction of the current flowing through the first coil part 130 (the clockwise or counter-clockwise direction). In other words, the lens module 110 may move in the optical axis direction (Z-axis or OX direction). Accordingly, the camera module 100 according to the embodiment may perform an auto-focus function. In the present specification, the term "inward" may refer to a direction toward the optical axis, and the term "outward" may refer to a direction opposite to "inward." For example, the "inward" may refer to a direction from the second bracket toward the first bracket, and the term "outward" may refer to a direction from the first bracket toward the second bracket.

In addition, the first coil part 130 may be positioned inside the magnet part 160. The magnet part 160 may be disposed at a predetermined distance from the first coil part 130.

The shafts 140 may be disposed under the first bracket 120. In addition, an outermost surface of the shaft 140 may be positioned outside an outermost surface of the first bracket 120.

The shafts 140 may be seated in the shaft groove of the second bracket 150. In addition, the shaft 140 may move along the shaft groove. In other words, the first bracket 120 coupled to the shaft 140 may move in the optical axis direction to correspond to movement (in the optical axis direction) of the shaft 140 along the shaft groove.

The second bracket 150 may have a hollow shape. Accordingly, the first bracket 120, the coil part 130, and the shaft 140 may be positioned in the hole of the central portion. According to the embodiment, the second bracket 150 may be positioned outside the first bracket 120, the coil part 130, and the shafts 140 to surround the first bracket 120, the coil part 130, and the shaft 140.

The second bracket 150 may have a closed loop shape. In addition, the second bracket may have a circular shape. In addition, the second bracket 150 may move in a direction (first or second direction) perpendicular to the third direction or the optical axis direction due to an electromagnetic interaction between the magnet part 160 and the second coil part 180 which will be described below. That is, optical image stabilization (OIS) can be performed.

According to the embodiment, the second bracket 150 may include magnet seating portions in which the magnet part 160 is disposed and shaft seating grooves in which the shafts are disposed. The magnet seating portions and the shaft seating grooves may be grooves open upward. In this case, an upper portion of each of the shaft seating grooves may be open so that the shaft 140 is seated and moves in the optical axis.

The magnet part 160 may be positioned in the magnet seating portions of the second bracket 150. The magnet seating portions may be the grooves as described above.

The magnet part 160 and the second bracket 150 may be coupled using an adhesive member or the like.

In addition, the magnet part 160 may include a plurality of magnets. According to the embodiment, the magnet part 160 may include four magnets. In addition, two magnets may face each other in the first direction (X-axis direction), and the remaining two magnets may face each other in the second direction (Y-axis direction).

In addition, a plurality of poles may be positioned on two surfaces of each of the magnets. For example, the magnet may be mounted in a two-pole magnetization manner. That is, in each of the magnets, an S-pole and an N-pole may be sequentially disposed in the third direction (Z-axis direction) in an inner region, and an N-pole and an S-pole may be sequentially disposed in the third direction (Z-axis direction) in an outer region. However, the present invention is not limited to the arrangement of two poles.

The third bracket 170 may be disposed outside the second bracket 150 and the magnet part 160. The third bracket 170 may be divided into a plurality of third brackets 170. For example, the third bracket 170 may be divided to correspond to the number of the magnets of the magnet part or the number of coils of the second coil part 180. However, the third bracket 170 is not limited thereto.

The third bracket 170 may be coupled to the coil substrates 190 and the second coil part 180 which will be described below. In addition, the third bracket 170 may be disposed on and coupled to the main substrate MP. Accordingly, in the camera module 100 according to the embodiment, the third bracket 170 may support the lens module 110, the first bracket 120, and the third bracket 170.

The second coil part 180 may be positioned to correspond to the magnet part 160. The second coil part 180 may include a plurality of coils. The plurality of coils may be positioned to correspond to the plurality of magnets of the magnet part 160. According to the embodiment, the number of the plurality of coils may be four.

The plurality of coils may be positioned outside the plurality of magnets to correspond to the magnets. In addition, a current may flow through each of the plurality of coils. That is, an electromagnetic interaction may occur between the second coil part 180 and the magnet part 160. In addition, an electromagnetic force may be generated according to the electromagnetic interaction, and the second bracket 150 may be moved by the generated electromagnetic force in the direction perpendicular to the optical axis direction (third direction or Z-axis direction). In addition, the first bracket 120 and the lens module 110 may move with the second bracket 150 in the direction perpendicular to the optical axis direction to correspond to the movement of the second bracket 150. Accordingly, the camera module 100 according to the embodiment may perform OIS.

The coil substrate 190 may be electrically connected to the second coil part 180. The coil substrate 190 may be coupled to the third bracket 170. Accordingly, the coil substrate 190 may be provided as the plurality of coil substrates 190 to correspond to the number of coils of the second coil part 180 or the number of third brackets 170. In addition, the coil substrate 190 may be disposed on the main substrate MP and electrically connected to the main substrate MP.

The main substrate MP may be positioned under the lens module 110, the first bracket 120, and the like. The main substrate MP may be formed of various materials. In addition, a driver DR may be positioned on the main substrate MP. The driver DR may generate a driving signal for performing auto-focusing (AF) or OIS. The driving signal may be generated to correspond to a control signal received from an external application processor (AP). For example, the driving signal may be a signal relating to a magnitude or direction of a current supplied to the first coil part or the second coil part.

The connection part CP may be connected to the main substrate MP. That is, the connection part CP is a part for improving a spatial limitation of the main substrate MP and the connector part CN may be disposed between the min substrate and the connection part CP. The connection part CP may extend in the direction (for example, the first direction or second direction) perpendicular to the optical axis direction. Accordingly, the camera module can be miniaturized in a mobile, optical device, or the like.

The connector part CN may be connected to one end of the connection part CP. That is, the connector part CN may be electrically connected to an external device, for example, a processor of a mobile device.

FIG. 3 is a perspective view illustrating the lens module, the first bracket, the first coil part, the shaft, the second bracket, and the magnet part which are coupled according to the embodiment, and FIG. 4 is an exploded perspective view of that of FIG. 3.

Referring to FIGS. 3 and 4, the lens module 110, the first bracket 120, the first coil part 130, the shaft 140, the second bracket 150, and the magnet part 160 according to the embodiment may be coupled to each other.

In this case, the lens module 110, the first bracket 120, the first coil part 130, and the shaft 140 may move in a direction different from a moving direction of the second bracket 150 and the magnet part 160. That is, the lens module 110, the first bracket 120, the first coil part 130, and the shaft 140 may move in the optical axis direction from the shaft seating groove of the second bracket 150.

In addition, as described above, the lens module 110 may be disposed inside the first bracket 120. In addition, the first bracket 120 may be disposed inside the first coil part 130. In addition, the first bracket and the first coil part 130 may be positioned inside the outermost surface of the shaft 140. In addition, the lens module 110, the first bracket 120, the first coil part 130, and the shaft 140 may be positioned inside the second bracket 150. In addition, the lens module 110, the first bracket 120, the first coil part 130, and the shaft 140 may be positioned inside the magnet part 160.

FIG. 5 is a perspective view illustrating the lens module according to the embodiment.

Referring to FIG. 5, the lens module 110 according to the embodiment may be formed of at least one lens. As described above, the lens module 110 may be moved by an electromagnetic force between the first coil part 130 and the magnet part 160 in the optical axis direction. Alternatively, the lens module 110 according to the embodiment may be moved by an electromagnetic force between the second coil part and the magnet part 160 in the direction perpendicular to the optical axis direction. The above-described content may be equally applied to the lens module 110.

FIG. 6 is a perspective view illustrating the first bracket, the first coil part, and the shaft according to the embodiment, FIG. 7 is atop view illustrating the first bracket, the first coil part, and the shaft according to the embodiment, and FIG. 8 is a side view illustrating the first bracket, the first coil part, and the shaft according to the embodiment.

Referring to FIGS. 6 to 8, the bracket 120 according to the embodiment may include a base part 121, a first protruding part 122, and a second protruding part 123. The base part 121 may be positioned inward.

In addition, the first protruding part 122 and the second protruding part 123 may be disposed outside the base part 121. In addition, the first protruding part 122 and the second protruding part 123 may be portions disposed along an outer surface of the base part 121 and protruding outward.

First, an inner surface of the base part 121 may have a circular shape and have a screw structure as described above.

The first protruding part 122 may be disposed on the outer surface of the base part 121. In addition, the first protruding part 122 may protrude outward from the outer surface of the base part 121.

In addition, the second protruding part 123 may be disposed on the outer surface of the base part 121. In addition, the second protruding part 123 may be disposed apart from the first protruding part 122. The second protruding part 123 may be positioned under the first protruding part 122. In addition, the second protruding part 123 may protrude outward from the outer surface of the base part 121. Accordingly, a groove may be formed between the first protruding part 122 and the second protruding part 123.

In addition, the first coil part 130 may be disposed in the formed groove. That is, the first coil part 130 may be disposed between the first protruding part 122 and the second protruding part 123. In addition, the first coil part 130 may be seated on the second protruding part 123.

In addition, the second protruding part 123 may include shaft grooves 123a open downward. Each of the shaft may be seated in one of the shaft grooves 123a. An adhesive member may be applied in the shaft groove 123a, and the shaft may be seated in the shaft groove 123a due to the adhesive member.

Accordingly, the first coil part 130 according to the embodiment may be disposed apart from the shaft 140 in the third direction. For example, the first coil part 130 may be disposed above the shaft 140.

In the embodiment, a maximum length d1 from the optical axis OX to the first coil part 130 may be greater than a maximum length d2 from the optical axis OX to the first protruding part 122. That is, based on the optical axis OX, the first coil part 130 may be disposed outside the first protruding part 122, and thus there may be a predetermined separation space dd1. Accordingly, in the first coil part 130, a magnetic force received from the magnet of the magnet part facing the first coil part 130 may not be reduced by the first protruding part 122. Accordingly, in the camera module according to the embodiment, a driving efficiency by the first coil part can be improved.

In addition, a maximum length d3 from the optical axis OX to the shaft 140 may be greater than the maximum length d1 from the optical axis OX to the first coil part 130 or the maximum length d2 from the optical axis OX to the first protruding part 122. Through such a configuration, OIS is performed, and thus, even when the first bracket moves with the second bracket in the direction perpendicular to the optical axis direction, contact between the first bracket and the second bracket may be blocked. In addition, by providing a separation space between the first bracket and the second bracket, a phenomenon in which a frictional force is generated by contact between the first bracket and the second bracket may be blocked.

FIG. 9 is a perspective view illustrating the second bracket and the magnet part which are coupled according to the embodiment. FIG. 10 is a top view illustrating the second bracket and the magnet part according to the embodiment.

Referring to FIGS. 9 and 10, the second bracket 150 according to the embodiment may include magnet seating portion (or groove) 150h and shaft seating grooves 150g.

As described above, the magnet seating grooves 150h may be positioned to correspond to the plurality of magnets of the magnet part 160. According to the embodiment, the magnet seating grooves 150h may be disposed in parallel in the first direction (X-axis direction) or second direction (Y-axis direction).

In addition, the shaft seating grooves 150g may be positioned adjacent to the magnet seating grooves 150h. According to the embodiment, the shaft seating grooves 150g may be symmetrically disposed with respect to any one of a first virtual line LX1 and a second virtual line LX2. In the embodiment, the first virtual line LX1 may be parallel to the first direction (X-axis direction) and may be a bisector of the magnet disposed in parallel to the first direction (X-axis direction). In addition, the second virtual line LX2 may be parallel to the second direction (Y-axis direction) and may be a bisector of the magnet disposed in parallel to the second direction (Y-axis direction). The optical axis OX may pass through an intersection point of the first virtual line LX1 and the second virtual line LX2.

Through such a configuration, even when the shafts 140 move along the shaft seating grooves 150g, the shafts 140 are not inclined in one direction. In addition, as described above, the shaft seating grooves 150g may be open upward. In addition, a width of each of the shaft seating grooves 150g may be constant in the third direction (Z-axis direction). Accordingly, even when the shaft moves along the shaft seating groove 150g in the optical axis or third direction (Z-axis direction), the shaft may not be inclined in one direction with respect to the optical axis.

In addition, a maximum length of the shaft seating groove 150g may be greater than a maximum length of a region excluding the shaft seating groove 150g in the second bracket 150. That is, an inner surface of the shaft seating groove 150g may be positioned further inward than an inner surface of the region excluding the shaft seating groove 150g in the second bracket 150. Accordingly, the shaft seating groove 150g may easily support the shaft 140 and serve to perform a stopper function in the third direction (Z-axis direction) at the same time. In this case, a maximum length may be a difference in maximum length between a length from the optical axis OX to the inner surface and a length from the optical axis OX to an outer surface.

In addition, the second bracket 150 may include a lower surface f2, a first side surface f1a, and a second side surface f1b of the shaft seating groove 150g. The lower surface f2 of the shaft seating groove 150g may be positioned between the first side surface f1a and the second side surface f1b of the shaft seating groove 150g. In addition, the second bracket 150 may include bracket protrusions 150p disposed adjacent to the shaft seating grooves 150g and protruding inward. Each of the bracket protrusions 150p may be in contact with the first side surface f1a and the second side surface f1b of the shaft seating groove 150g.

In addition, since the shaft is in contact with only a part of the first side surface f1a and only a part of the second side surface f1b of the shaft seating groove 150g, a contact area between the shaft and the second bracket 150 may be minimized. Accordingly, degradation of linearity of the shaft in the third direction or the optical axis direction according to a shape of a contact region between the shaft and the second bracket 150 can be prevented. In the camera module according to the embodiment, the first bracket can move with improved linearity in the third direction or the optical axis direction.

The bracket protrusion 150p may be in contact with the shaft. In addition, a part of the shaft 140 may be positioned at the shaft seating groove 150g. In other words, at least a part of the shaft 140 may overlap the shaft seating groove 150g in the third direction (Z-axis direction).

In addition, a curvature of the bracket protrusion 150p may be the same as a curvature of an outer surface of the shaft in contact with the bracket protrusion 150p. Accordingly, the bracket protrusion 150p may easily support the shaft. In addition, the bracket protrusion 150p may be formed inward to compensate for a gap between the second bracket 150 and the first bracket 120.

In addition, at least a part of the lower surface f2 of the shaft seating groove 150g may overlap the shaft 140 in the third direction (Z-axis direction). Through such a configuration, the shaft 140 may be seated on and supported by the lower surface f2 of the shaft seating groove 150g. For example, the lower surface f2 of the shaft seating groove 150g may serve as a support or stopper for the shaft.

In addition, the side surfaces f1a and f1b of the shaft seating groove 150g may be inclined outward. Accordingly, a width of the shaft seating groove 150g according to the embodiment may increase outward from an inner side. Through such a configuration, movement of the shaft may be regardless of a structure of the second bracket 150. Accordingly, the movement of the shaft according to a gradient may be accurately performed in the third direction (Z-axis direction).

As another embodiment, a second bracket 150 may include only shaft seating grooves 150g without the bracket protrusions 150p. In other words, shafts may be in contact with the shaft seating grooves 150g instead of the bracket protrusions 150p and may be supported by sidewalls of the shaft seating grooves 150g. Even in this case, as described above, side surfaces f1a and f1b of the shaft seating grooves 150g may be inclined outward. Accordingly, a width of each of the shaft seating grooves 150g according to the embodiment may increase outward from an inner side. Through such a configuration, movement of the shaft may be regardless of a structure of the second bracket 150. Accordingly, the movement of the shaft according to a gradient can be accurately performed in a third direction (Z-axis direction).

In addition, separation of a shaft 140 is prevented by the shaft seating groove 150g, and thus reliability of the component can be improved. In addition, even when the shaft 140 applies a force to the second bracket 150 outward to perform OIS, contact between the shaft 140 and the side surfaces f1a and f1b of the shaft seating groove 150g can be prevented. Accordingly, generation of a frictional force which is noise can be prevented, and a first bracket may accurately move in an optical axis direction or the third direction (Z-axis direction) without being inclined.

FIG. 11 is a view for describing operation of the camera module according to the embodiment, FIG. 12 is a side view of FIG. 11, and FIG. 13 is a cross-sectional view along line KK' in FIG. 12.

Referring to FIGS. 11 and 12, a current my flow through the first coil part 130 in the clockwise direction (based on an upper surface). In addition, in an inner region of the magnet part 160, the N-pole may be positioned in an upper portion, and the S-pole may be positioned in a lower portion. That is, in the magnet, the plurality of poles may be positioned at two surfaces. For example, the magnet may be a single-pole or two-pole magnetization type magnet.

According to the embodiment, in the inner region of each of the magnet, the S-pole and the N-pole may be sequentially disposed in the third direction (Z-axis direction), and in the outer region, the N-pole and the S-pole may be sequentially disposed in the third direction (Z-axis direction). However, the present invention is not limited to such an arrangement of two poles.

In addition, the first coil part 130 may move in the third direction (Z-axis direction) only in an upper portion in the inner region. In other words, a moving range OR of the first coil part 130 may correspond to any one pole (for example, the N-pole) in the inner region of the magnet part. According to the embodiment, the moving range OR of the first coil part 130 may be the same as a height of any one pole (for example, the N-pole) in the inner region of the magnet part in the third direction (Z-axis direction).

Accordingly, a direction of a magnetic field applied to the first coil part 130 may be an inward direction. In other words, the magnetic field which is one fact of an interaction between the first coil part 130 and the magnet part 160 may be generated in the inward direction. Based on this, movement of the lens module or the like due to an electromagnetic force will be described.

According to the embodiment, the magnet part 160 may include a first magnet 161 to a fourth magnet 164. In addition, the first magnet 161 and the third magnet 163 may be disposed in parallel in the first direction (X-axis direction) and may face each other. In addition, the second magnet 162 and the fourth magnet 164 may be disposed in parallel in the second direction (Y-axis direction) and may face each other.

In this case, a magnetic field B1 is generated by the first magnet 161 in a direction opposite to the first direction (X-axis direction), and a current I1 flows through the first coil part 130 in a direction opposite to the direction second direction.

Accordingly, an electromagnetic force F1 is generated by the magnetic field B1 and the current I1 in a (downward) direction opposite to the third direction (Z-axis direction).

In addition, a magnetic field B2 is generated by the second magnet 162 in the second direction (Y-axis direction), and a current I2 flows through the first coil part 130 in a region facing the N-pole of the second magnet 162 in the direction opposite to the first direction. Accordingly, an electromagnetic force F2 is generated by the magnetic field B2 and the current I2 in the (downward) direction opposite to the third direction (Z-axis direction).

In addition, a magnetic field B3 is generated by the third magnet 163 in the first direction (X-axis direction), and a current I3 flows through the first coil part 130 in a region (N-pole) facing the third magnet 163 in the second direction (Y-axis direction). Accordingly, an electromagnetic force F3 is generated by the magnetic field B3 and the current I3 in the (downward) direction opposite to the third direction (Z-axis direction).

In addition, a magnetic field B4 is generated by the fourth magnet 164 in the direction opposite to the second direction, and a current i4 flows through the first coil part 130 in a region facing the fourth magnet 164 in the first direction (X-axis direction). Accordingly, an electromagnetic force F4 is generated by the magnetic field B4 and the current i4 in the third direction (Z-axis direction). In this case, the first coil part 130, the first bracket, and a first lens barrel may be moved by the electromagnetic forces F1 to F4 in the third direction (Z-axis direction) or downward direction.

In addition, when a current flows through the first coil part 130 in the counter-clockwise direction, the first lens barrel may move in the direction opposite to the third direction or upward direction.

Referring to FIG. 13, a part of the outer surface of the shaft 140 according to the embodiment may be surrounded by the shaft groove 123a. In addition, another part of the outer surface of the shaft 140 may be positioned in the shaft seating groove 150g.

According to the embodiment, an area of a region S1 of the shaft 140 surrounded by the shaft groove 123a may be greater than an area S2 positioned in the shaft seating groove 150g. Through such a configuration, even movement of the first bracket 120, separation of the shaft 140 from the shaft seating groove 150g can be prevented. That is, reliability between the components can be improved.

In addition, the first bracket 120 and the shaft 140 may be coupled by an adhesive member OE or the like. For example, the adhesive member OE may be positioned on the shaft groove 123a, and the shaft 140 may be positioned on the adhesive member OE.

In addition, an outer surface 123e of the second protruding part 123 may be inclined outward. Particularly, the outer surface 123e of the second protruding part 123 may be further away from the optical axis as being close to the shaft 140. Through such a configuration, a separation distance between the first bracket 120 and the second bracket 150 is secured, and thus, occurrence of a failure of AF operation due to contact between the first bracket and the second bracket can be prevented. In addition, a coupling force between the first bracket 120 and the shaft 140 can also be improved.

FIG. 14 is a top view illustrating the second bracket, the magnet part, the third bracket, the second coil part, the coil substrate, the main substrate, the connection part, and the connector part according to the embodiment, and FIG. 15 is a top view illustrating the main substrate according to the embodiment.

Referring to FIGS. 14 and 15, the second bracket 150 may have the hollow shape as described above. Accordingly, the first bracket 120, the coil part 130, the shaft 140, and the like may be positioned in the hole of the central portion. According to the embodiment, the second bracket 150 may be positioned outside the first bracket 120, the coil part 130, and the shaft 140 to surround the first bracket 120, the coil part 130, and the shaft 140.

The magnet part 160 may be positioned on the magnet seating portions of the second bracket 150. The magnet seating portions may be the grooves as described above.

The third bracket 170 may be disposed outside the second bracket 150 and the magnet part 160. The third bracket 170 may be divided into the plurality of third brackets 170. For example, the third bracket 170 may be divided to correspond to the number of the magnets or the number of the coils of the second coil part 180. However, the third bracket 170 is not limited thereto.

The third bracket 170 may be coupled to the coil substrate 190 and the second coil part 180 which will be described below. In addition, the third bracket 170 may be disposed on and coupled to the main substrate MP. Accordingly, in the camera module 100 according to the embodiment, the third bracket 170 may support the lens module 110, and the first bracket 120.

The second coil part 180 may be positioned to correspond to the magnet part 160. The second coil part 180 may include the plurality of coils. The plurality of coils may be positioned to correspond to the plurality of magnets of the magnet part 160. According to the embodiment, the number of the plurality of coils may be four.

The plurality of coils may be disposed outside the plurality of magnets to correspond to the magnets. In addition, a current may flow through each of the plurality of coils. That is, an electromagnetic interaction may occur between the second coil part 180 and the magnet part 160. In addition, an electromagnetic force may be generated according to the electromagnetic interaction, and the second bracket 150 may be moved by the generated electromagnetic force in the direction perpendicular to the optical axis direction (third direction or Z-axis direction). In addition, the first bracket 120 and the lens module 110 may move with the second bracket 150 in the direction perpendicular to the optical axis direction to correspond to the movement of the second bracket 150. Accordingly, the camera module 100 according to the embodiment may perform OIS.

The coil substrate 190 may be electrically connected to the second coil part 180. The coil substrate 190 may be coupled to the third bracket 170. Accordingly, the coil substrate 190 may be provided as the plurality of coil substrates 190 to correspond to the number of the coils of the second coil part 180 or the number of the third brackets 170. In addition, the coil substrate 190 may be disposed on and electrically connected to the main substrate MP. According to the embodiment, the coil substrate 190 may be electrically in contact with an electrode terminal PJ disposed on the main substrate MP. Accordingly, mechanical coupling and electrical connection can be easily performed.

The main substrate MP may be positioned under the lens module 110, the first bracket 120, and the like. The main substrate MP may be formed of various materials. In addition, the driver DR may be positioned on the main substrate MP. The driver DR may generate a driving signal for performing AF or OIS. The driving signal may be generated to correspond to a control signal received from an external AP. For example, the driving signal may be a signal relating to a magnitude or direction of a current supplied to the first coil part or the second coil part.

The connection part CP may be connected to the main substrate MP. That is, the connection part CP is a part for improving a spatial limitation of the main substrate MP and the connector part CN may be disposed between the min substrate and the connection part CP. The connection part CP may extend in the direction (for example, the first direction or second direction) perpendicular to the optical axis direction. Accordingly, the camera module can be miniaturized in a mobile or the like.

The connector part CN may be connected to one end of the connection part CP. That is, the connector part CN may be electrically connected to an external device, for example, a processor of a mobile device.

FIG. 16 is a view illustrating the optical device including the camera module according to the embodiment.

Referring to FIG. 16, as described above, the optical device according to the embodiment may include a front case fc, a rear case rc, and the camera module 100 disposed in each of the front case fc and the rear case rc or disposed between the front case fc and the rear case rc.

In addition, an optical device 10 according to the embodiment may include the camera module 100. Accordingly, the optical device may capture an image through the camera module 100 which outputs an image. In addition, as described above, the optical device can include the camera module in which occurrence of movement, that is, noise, according to a gradient is reduced when AF is performed While the present invention has been mainly described above with reference to embodiments, it will be understood by those skilled in the art that the present invention is not limited to the embodiments, but the embodiments are only exemplary, and various modifications and applications which are not illustrated above may be made without departing from the essential features of the present embodiments. For example, components specifically described in the embodiments may be modified and implemented. In addition, it should be interpreted that differences related to modifications and applications fall within the scope of the present invention defined by the appended claims.

The invention claimed is:

1. A camera module comprising:
a first bracket;
a lens module accommodated in the first bracket;
a second bracket disposed outside the first bracket; and
a shaft disposed between the first bracket and the second bracket,
wherein the second bracket includes:
a shaft seating groove in which the shaft is seated and which is open in an optical axis direction; and
a bracket protrusion which is adjacent to the shaft seating groove and protrudes inward, and
wherein a side surface of the shaft seating groove is inclined in an outward direction and has a width which increases in the outward direction.

2. The camera module of claim 1, further comprising a first coil part disposed outside the first bracket,
wherein a maximum length from an optical axis to the first coil part is greater than a maximum length from the optical axis to the first bracket.

3. The camera module of claim 1, further comprising:
a magnet part; and
a first coil part surrounding the magnet part.

4. The camera module of claim 3, wherein the first coil part moves within a height of any one pole in an inner region of the magnet part in the optical axis direction.

5. The camera module of claim 3, wherein the magnet part includes a plurality of magnets, and
wherein the plurality of magnets are disposed in parallel in a first direction or a second direction perpendicular to the optical axis direction.

6. The camera module of claim 3, wherein the second bracket further includes a magnet seating portion on which the magnet part is seated.

7. The camera module of claim 6, wherein the magnet seating portion is provided in plurality, wherein the shaft seating groove is provided in plurality, and wherein the magnet seating portions and the shaft seating grooves are disposed symmetrically with respect to the direction perpendicular to the optical axis direction.

8. The camera module of claim 6, wherein the magnet seating portion is arranged side by side in a direction perpendicular to the optical axis direction.

9. The camera module of claim 1, wherein the first bracket includes:
a bracket base;
a first protruding part protruding outward from an outer surface of the bracket base; and
a second protruding part protruding outward from the outer surface of the bracket base,
wherein the first protruding part is disposed above the second protruding part.

10. The camera module of claim 9, wherein the first coil part is disposed between the first protruding part and the second protruding part.

11. The camera module of claim 1, wherein the first coil part has a closed loop and is disposed between the first bracket and the second bracket.

12. The camera module of claim 1, wherein the shaft seating groove is open upward.

13. The camera module of claim 1, wherein a width of the shaft seating groove is constant in the optical axis direction.

14. A camera module comprising:
a first bracket;
a lens module accommodated in the first bracket;
a second bracket disposed outside the first bracket; and
a shaft disposed between the first bracket and the second bracket,
wherein the second bracket includes a shaft seating groove in which the shaft is seated and which is open in an optical axis direction, and
wherein a maximum length of the shaft seating groove is greater than a maximum length of a region excluding the shaft seating groove in the second bracket.

15. The camera module of claim 1, wherein an inner surface of the shaft seating groove is positioned further inward than an inner surface of the region excluding the shaft seating groove in the second bracket.

16. The camera module of claim 1, wherein the second bracket includes a lower surface, a first side surface, and a second side surface of the shaft seating groove.

17. The camera module of claim 16, wherein the lower surface of the shaft seating groove is positioned between the first side surface and the second side surface of the shaft seating groove.

18. The camera module of claim 16, wherein the second bracket includes bracket protrusions disposed adjacent to the shaft seating groove and protruding inward.

19. The camera module of claim 18, wherein the bracket protrusions are in contact with the first side surface and the second side surface of the shaft seating groove.

* * * * *